United States Patent
Koito et al.

(10) Patent No.: US 8,749,746 B2
(45) Date of Patent: Jun. 10, 2014

(54) LIQUID CRYSTAL PANEL INCLUDING PAIRS OF PILLAR STRUCTURES, AND LIQUID CRYSTAL DISPLAY DEVICE INCLUDING THE LIQUID CRYSTAL PANEL

(75) Inventors: Takeo Koito, Kanagawa (JP); Shuji Hayashi, Kanagawa (JP)

(73) Assignee: Japan Display West Inc., Aichi (JP)

( * ) Notice: Subject to any disclaimer, the term of this patent is extended or adjusted under 35 U.S.C. 154(b) by 1187 days.

(21) Appl. No.: 12/632,290

(22) Filed: Dec. 7, 2009

(65) Prior Publication Data

US 2010/0141880 A1 Jun. 10, 2010

(30) Foreign Application Priority Data

Dec. 9, 2008 (JP) .................................. 2008-313311

(51) Int. Cl.
*G02F 1/1339* (2006.01)

(52) U.S. Cl.
USPC ............................. 349/156; 349/155; 349/157

(58) Field of Classification Search
USPC .................................................. 349/155–157
See application file for complete search history.

(56) References Cited

U.S. PATENT DOCUMENTS

| 7,630,051 B2 * | 12/2009 | Lee | 349/155 |
| 2005/0237470 A1 * | 10/2005 | Kadotani | 349/155 |
| 2006/0203178 A1 * | 9/2006 | Cho et al. | 349/156 |
| 2006/0227271 A1 * | 10/2006 | Park | 349/130 |
| 2006/0262265 A1 * | 11/2006 | Lee | 349/155 |
| 2007/0070047 A1 | 3/2007 | Jeon et al. | |

FOREIGN PATENT DOCUMENTS

| JP | HEI 11-109367 A | 4/1999 |
| JP | 2000-267114 A | 9/2000 |
| JP | 2001-075074 A | 3/2001 |
| JP | 2001-296530 A | 10/2001 |
| JP | 2003-121859 A | 4/2003 |
| JP | 2004-198643 A | 7/2004 |
| JP | 2005-122150 | 5/2005 |
| JP | 2006-084897 A | 3/2006 |
| JP | 2006-227459 A | 8/2006 |
| JP | 2007-052368 | 3/2007 |
| JP | 2007-095044 | 4/2007 |
| JP | 2008-170690 A | 7/2008 |

OTHER PUBLICATIONS

Japanese Patent Office, Office Action issued in Patent Application JP 2008-313311, on Nov. 24, 2010.

* cited by examiner

*Primary Examiner* — Huyen Ngo

(74) *Attorney, Agent, or Firm* — Dentons US LLP

(57) ABSTRACT

A liquid crystal panel including a pair of substrates facing each other with a space in between and a liquid crystal layer disposed in the space between the pair of substrates. Further, the liquid crystal panel includes a plurality of pairs of pillar structures. Each pair of pillar structures is arranged on opposing faces of the pair of substrates, respectively, to face each other along a normal to the opposing faces. With the benefit of such pillar configuration, degradation of the liquid crystal panel due to an external pressure may be decreased.

18 Claims, 10 Drawing Sheets

LIQUID CRYSTAL PANEL INCLUDING PAIRS OF PILLAR STRUCTURES, AND LIQUID CRYSTAL DISPLAY DEVICE INCLUDING THE LIQUID CRYSTAL PANEL

BACKGROUND OF THE INVENTION

1. Field of the Invention

The present invention relates to a liquid crystal panel in which countermeasures against external pressure are taken, and a liquid crystal display device.

2. Description of the Related Art

A liquid crystal display device has advantages in terms of thinness, light weight, and low electric power consumption. Thus, the liquid crystal display device has been widely used in an electric device for mobile applications, such as a cell-phone, and a digital camera. The liquid crystal display device includes a liquid crystal panel in which a liquid crystal layer is sealed between a pair of substrates. In the liquid crystal display device, light emitted from a backlight which is arranged on a back face of the liquid crystal panel is modulated in the liquid crystal panel, and the modulated light is output from a front face of the liquid crystal panel to the outside, thereby an image display is performed.

In recent years, a sensor function called a touch panel has been installed in the liquid crystal display device. A user's finger or pen touches an icon or the like displayed on a screen, thereby the touch panel inputs data. Usually, the touch panel is arranged on a contact face (that is, the top surface of the liquid crystal display device) with which the finger, the pen, or the like is in contact, so that instructions indicated on the screen of the liquid crystal display device may be selected with the finger, the pen, or the like. The touch panel detects a position where the finger, the pen, or the like is in contact with, and outputs the instruction corresponding to the contact position, as an input signal. In this manner, in the touch panel, it is unnecessary to provide a keyboard and a mouse typically used in a computer or the like, and a keypad typically used in a mobile device such as a cell-phone. Therefore, the use of the touch panel tends to be spread.

However, there are some issues in the above-described touch panel. For example, in the case where the touch panel is arranged on the top surface of the liquid crystal display device, the liquid crystal display device itself increases in thickness and size. Moreover, there are such issues that optical characteristics are deteriorated due to influence of a refractive interface, and the manufacture cost is up since the touch panel is manufactured separately from the liquid crystal panel. Thus, in recent years, it is considered to integrally form the liquid crystal panel and the touch panel. With such integration, several merits may be obtained, in addition to the solution for the issue indicated above as an example. For example, since an existing wiring (for example, an array wiring for display) in the liquid crystal panel may be used in common, it is possible to obtain additional functions such as high resolution and multipoint detection.

For example, in Japanese Unexamined Patent Publication No. 2007-95044, a liquid crystal display device as the integrated liquid crystal display device is proposed. When external pressure with a touch of the finger, the pen, or the like is applied to the contact face, an electrode in a facing substrate and an electrode in an array substrate are electrically in contact with each other, thereby a mechanism installed in the liquid crystal display device detects the contact position.

SUMMARY OF THE INVENTION

However, there is a serious issue in the technique of Japanese Unexamined Patent Publication No. 2007-95044. Usually, alignment films aligning liquid crystal between the facing substrate and the array substrate are stacked on opposing faces of the facing substrate and the array substrate, respectively. Therefore, there are the alignment films on the surfaces of the electrodes used at the time of the position detection. The alignment films are typically made of insulating material. Thus, when the electrode in the facing substrate and the electrode in the array substrate are in contact with each other due to the external pressure, the contact sensitivity is low since the alignment films intervene between the electrodes, and it is necessary to strongly press the contact face with the finger, the pen, or the like. Moreover, when the contact with the finger, the pen, or the like is repeated, the alignment film on the electrode is damaged, and may be peeled off. As a result, there are risks that alignment failure occurs, and the peeled-off alignment film floats in the liquid crystal so that display failure occurs. Reliability of the repeated use is low.

To solve such issues, for example, in Japanese Unexamined Patent Publication No. 2007-52368, it is proposed to remove the portions in contact with each other at the time of the position detection, in one or both of the alignment film on the facing substrate side and the alignment film on the array substrate side. However, to use the method of Japanese Unexamined Patent Publication No. 2007-52368, it is necessary to separately perform a step of removing the alignment film. In Japanese Unexamined Patent Publication No. 2007-52368, as the method of removing the alignment film, it is described that solvent is applied with an inkjet, and the alignment film is dissolved before being burned. However, in the case where such a method is used, reduction in the yield rate is caused by various issues such as bleeding of the solvent, an issue of position accuracy, an increase in manufacture cost, reduction in throughput, and splash of the solvent.

Moreover, a device like an inkjet is not used during the typical manufacture process of the liquid crystal. Thus, existing equipment may not be diverted, and new equipment investment is necessary. For removing the alignment film, it is considered to select another process such as lithography. However, since the number of steps increases, reduction in productivity, and the increase in manufacture cost are brought. In terms of characteristics, since a margin is necessary when removing the alignment film, the opening ratio decreases. In terms of reliability, influence on reliability against burning or the like, reduction in flexibility of material for the alignment film, or the like is concerned.

Friction of the alignment film due to the external pressure is not an issue which occurs only in such a sensor-mounted device. In the related art, when a cover protecting a display face is mounted on the liquid crystal panel, such a configuration is employed that, for example, the cover is arranged on the liquid crystal panel with an air gap in between, so that the external pressure is less likely to be applied directly on the liquid crystal panel, and even when the external pressure is applied, the pressure is weak. However, in recent years, since reduction in thickness is demanded, the configuration in which the cover is directly bonded to the liquid crystal panel without the air gap in between, and the configuration called windowless in which the liquid crystal panel is bare without the cover itself are employed. Thus, high pressure is applied directly on the liquid crystal panel. Moreover, the thickness of glass in the liquid crystal panel is progressively reduced, and the amount of deformation of the liquid crystal panel increases due to the external pressure. Therefore, it is necessary to intensify the internal structure of the liquid crystal panel.

For example, as described in Japanese Unexamined Patent Publication No. 2005-122150, a second spacer which is different form a spacer of the related art is provided. However, even when such a second spacer is provided, similarly to the above, the damage on the alignment film due to the external pressure is concerned, and there is an issue of reduction in the reliability against the external pressure.

In view of the foregoing, it is desirable to provide a liquid crystal panel allowing reliability deterioration due to external pressure to be suppressed without yield rate degradation, and to provide a liquid crystal display device including the liquid crystal panel.

According to an embodiment of the present invention, there is provided a liquid crystal panel including: a pair of substrates facing each other with a space in between; a liquid crystal layer disposed in the space between the pair of substrates; and a plurality of pairs of pillar structures, each pair of pillar structures being arranged on opposing faces of the pair of substrates, respectively, to face each other along a normal to the opposing faces.

According to an embodiment of the present invention, there is provided a liquid crystal display device including a liquid crystal panel and a surface-emitting light source emitting light to the liquid crystal panel. Here, the liquid crystal panel includes: a pair of substrates facing each other with a space in between; a liquid crystal layer disposed in the space between the pair of substrates; and a plurality of pairs of pillar structures, each pair of pillar structures being arranged on opposing faces of the pair of substrates, respectively, to face each other along a normal to the opposing faces.

In the liquid crystal panel and the liquid crystal display device according to the embodiments of the present invention, a plurality of pairs of pillar structures may be configured, each pair of pillar structures being arranged on opposing faces of the pair of substrates, respectively, to face each other along a normal to the opposing faces. Thereby, for example, top faces of the pair of pillar structures are directly or indirectly in contact with each other when one or both of the substrates is flexed to a liquid crystal layer side due to external pressure applied thereon. Thereby, with the pillar structures, it is possible to maintain the durability against the external pressure, in the liquid crystal panel. Moreover, in the sensor-mounted device, for example, the tops of the pillar structures are directly or indirectly in contact with each other. Thereby, it is possible to perform the position detection. Here, the portions (hereafter, simply refer to contact portions) in contact with each other with the external pressure are arranged in the positions higher than the other portions, by the height of the pillar structures, respectively. Thus, when forming the alignment films, even when the alignment films are applied over the whole surface, the wettability of the contact portions is low. Therefore, the alignment films are hardly formed, or are not formed at all in the contact portions, respectively. As a result, there is almost no damage, or there is no damage at all on the alignment films due to the external pressure. Thus, reliability of the repeated use is high. Moreover, as described above, since the alignment films are hardly formed, or not formed at all in the contact portions, it is unnecessary to purposely remove a part of the alignment films. Thereby, it is possible to eliminate generation of failure due to the process of removing the alignment films.

According to the liquid crystal panel and the liquid crystal display device of the embodiments of the present invention, a plurality of pairs of pillar structures may be configured, each pair of pillar structures being arranged on opposing faces of the pair of substrates, respectively, to face each other along a normal to the opposing faces. Thereby, the reliability of the repeated use is high, and it is possible to eliminate generation of the failure due to the process of removing the alignment films. Therefore, it is possible to suppress reduction in the reliability against the external pressure without reducing the yield rate.

Other and further objects, features and advantages of the invention will appear more fully from the following description.

DETAILED DESCRIPTION OF THE PREFERRED EMBODIMENTS

Preferred embodiments (hereinafter, simply referred to as embodiments) of the present invention will be described in detail with reference to the accompanying drawings. The description will be made in the following order.
1. First embodiment (sensor-mounted type)
2. Modification (spacer)
3. Second embodiment (pressure-resistant type)
4. Modification (spacer)

First Embodiment

Configuration of Liquid Crystal Display Device 1

Figure 1:
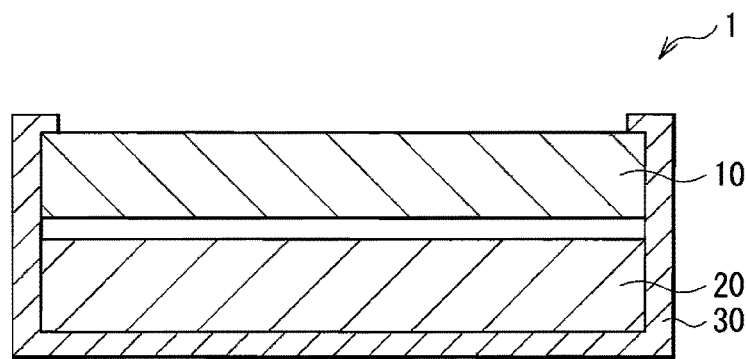
FIG. 1 is a cross sectional view illustrating an example of the configuration of a liquid crystal display device according to a first embodiment of the present invention.

FIG. 1 illustrates an example of the schematic configuration of a liquid crystal display device 1 according to a first embodiment of the present invention. The liquid crystal display device 1 according to the first embodiment includes a liquid crystal panel 10, a backlight 20 (surface-emitting light source) arranged on a back side of the liquid crystal panel 10, a case 30 supporting the liquid crystal panel 10 and the backlight 20, and a drive circuit (not illustrated in the figure) displaying an image by driving the liquid crystal panel 10. In the liquid crystal display device 1, a front face of the liquid crystal panel 10 (surface on an side opposite from the backlight 20) is oriented to an observer (not illustrated in the figure) side.

Liquid Crystal Panel 10

Figure 2:
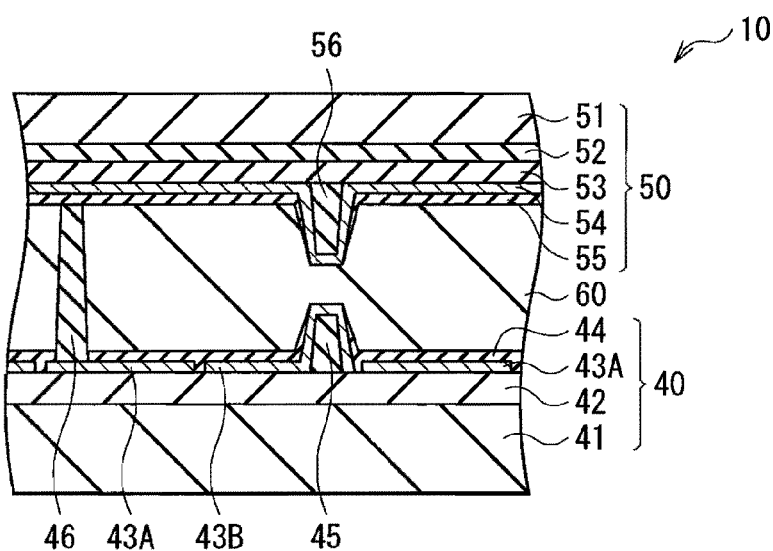
FIG. 2 is a cross sectional view illustrating an example of the configuration of a liquid crystal panel in FIG. 1.

The liquid crystal panel 10 displays an image. The liquid crystal panel 10 is a so-called sensor-mounted panel, and mounts a sensor function which inputs data with a touch of a user's finger, a pen, or the like on an icon or the like displayed on a screen. The liquid crystal panel 10 is, for example, a transmissive display panel in which each pixel is driven in response to an image signal, and has the configuration including a pair of transparent substrates with a liquid crystal layer in between. Specifically, as illustrated in FIG. 2, the liquid crystal panel 10 includes a pair of an array substrate 40 and a facing substrate 50 facing each other with a space in between, and a liquid crystal layer 60 arranged in the space between the pair of the array substrate 40 and the facing substrate 50.

The array substrate 40 is a transparent substrate on the backlight 20 side, and includes, for example, a transparent substrate 41, a planarization film 42, a pixel electrode 43A and a sensor electrode 43B (conductive films), and an alignment film 44 in this order from the backlight 20 side. On the other hand, the facing substrate 50 is a transparent substrate on the observer side, and includes, for example, a transparent substrate 51, a color filter 52, a planarization film 53, a facing electrode 54, and an alignment film 55 in this order from the observer side.

The transparent substrates 41 and 51 are each made of a substrate which is transparent to visible light, for example, plate glass. In the transparent substrate 41 on the backlight 20 side, although not illustrated in the figure, an active drive circuit including a TFT (thin film transistor), a gate line GL connected to a gate of the TFT, a signal line DL connected to a source of the TFT, a connecting wiring connected to a drain of the TFT, and the pixel electrode 43A or the sensor electrode 43B, or the like is formed. The gate line GL, the signal line DL, and the connecting wiring correspond to a specific example of "a wiring layer" according to the embodiment of the present invention.

The planarization film 42 is made of, for example, PC type material manufactured by JSR Corporation. The planarization film 53 is made of, for example, SS type material or NN type material. The planarization film 42 moderates a convex-concavo on the surface formed with the TFT, the gate line GL, the signal line DL, or the like, to form the planarized surface. The surface of the planarization film 42 is in a convex-concavo shape which is more moderate than the convex-concavo immediately below the planarization film 42. For example, in the case where the thickness of the signal line DL forming the large convex-concavo is approximately 1 μm to 2 μm, the thickness of the convex-concavo on the surface of the planarization film 42 is approximately half (0.5 μm to 1 μm) the thickness of the signal line DL, at a maximum. On the other hand, the planarization film 53 moderates a convex-concavo on the surface of the color filter 52 to form the planarized surface. The surface of the planarization film 53 is in the convex-concavo shape which is more moderate than the convex-concavo immediately below the planarization film 53 (the observer side). For example, in the color filter 52, in the case where an end of a red filter and an end of a green filter overlap each other, the thickness of the convex-concavo on the surface of the planarization film 53 is approximately half the thickness of the convex-concavo formed with the overlap, at a maximum.

The pixel electrode 43A, the sensor electrode 43B, and the facing electrode 54 are made of, for example, ITO (indium tin oxide). The pixel electrode 43A is, for example, arranged in a lattice arrangement or a delta arrangement above the transparent substrate 41, and serves as an electrode for each pixel. The sensor electrode 43B is arranged for one or a plurality of pixels. When the user touches the screen with his finger or pen, and the facing substrate 50 is flexed to the array substrate 40 side with external pressure, the sensor electrode 43B serves as a contact terminal with which a portion in the facing substrate 54, corresponding to immediately below a pillar structure 56, which will be described later, is in contact. On the other hand, the facing electrode 54 is formed over the whole surface of the planarization film 53, and serves as a common electrode facing each pixel electrode 43A and each sensor electrode 43B.

The alignment films 44 and 55 are made of, for example, polymer material such as polyimide, and perform alignment process on the liquid crystal. The alignment film 44 covers an approximately whole surface of an opposing face 40A which faces the facing substrate 50, in the array substrate 40. However, the alignment film 44 is hardly formed, or is not formed at all in a portion immediately above a pillar structure 45, which will be described later. Similarly, the alignment film 55 covers an approximately whole surface of an opposing face 50A which faces the array substrate 40, in the facing substrate 50. However, the alignment film 55 is hardly formed, or is not formed at all in a portion immediately below the pillar structure 56. The expression "the alignment film 44 is hardly formed" means that the alignment film 44 is thinner than a portion in the opposing face 40A, the portion being arranged on a face except for the top of the pillar structure 45. The expression "the alignment film 55 is hardly formed" means that the alignment film 55 is thinner than a portion in the opposing face 50A, the portion being arranged on a face except for the top of the pillar structure 56.

The color filter 52 has the configuration where a color filter which separates light transmitting the liquid crystal layer 60 to, for example, three primary colors of red (R), green (G), and blue (B), or to four colors of R, G, B, and white (W) is arranged corresponding to the arrangement of the pixel electrode 43A. As a filter arrangement (pixel arrangement), typically, there are a stripe arrangement, a diagonal arrangement, the delta arrangement, and a rectangle arrangement.

The liquid crystal layer 60 is made of, for example, liquid crystal of VA (vertical alignment) mode, TN (twisted nematic) mode, STN (super twisted nematic) mode, or FFS (fringe field switching) mode. With voltage applied from the drive circuit, the liquid crystal layer 60 has a function to change, for each pixel, a direction of a polarization light axis of the light emitted from the backlight 20. By changing the alignment of the liquid crystal in multistage, the direction of the transmission axis is adjusted for each pixel in multistage.

Although not illustrated in the figure, a polarizer is provided on each of the surface on the light incident side, and the surface on the light emitting side, in the liquid crystal panel 10. The polarizer is a kind of optical shutters, and allows only light (polarized light) in a certain vibration direction to pass. The polarizer on the light incident side and the polarizer on the light emitting side are arranged so that a polarizing axis of the polarizer on the light incident side and a polarizing axis of the polarizer on the light emitting side are angled at 90 degrees different from each other. Thereby, the light emitted from the backlight 20 transmits the liquid crystal panel 10 through the liquid crystal layer 60, or is blocked.

Spacer 46

In the liquid crystal panel 10, a spacer 46 determining a space between the array substrate 40 and the facing substrate 50 is provided. The spacer 46 is arranged in one of the array substrate 40 and the facing substrate 50 in the manufacture process. In the first embodiment, as illustrated in FIG. 2, the spacer 46 is arranged on the array substrate 40 side for convenience sake. The spacer 46 is made of, for example, acrylic material such as NN type material and PC type material manufactured by JSR Cooperation. As illustrated in FIG. 2, for example, the spacer 46 has a pillar shape, and is formed on the pixel electrode 43A. The top of the spacer 46 is in contact with the opposing face 50A (for example, the surface of the alignment film 55) in the facing substrate 50. Thereby, the space between the array substrate 40 and the facing substrate 50 is uniformly maintained to be, for example, approximately 3 μm.

Pillar Structures 45 and 56

On the liquid crystal panel 10, in addition to the spacer 46, pillar structures 45 and 56 are provided separately from the spacer 46.

The pillar structure 45 is arranged on the opposing face 40A side of the array substrate 40. Specifically, the pillar structure 45 is in contact with the planarization film 42, and the sensor electrode 43B is arranged on the top and the side face of the pillar structure 45. That is, in the first embodiment, the pillar structure 45 is covered with the sensor electrode 43B. Here, as described above, the alignment film 44 is formed on the opposing face 40A in the array substrate 40. However, the alignment 44 is hardly formed, or is not formed at all at least on a portion in the sensor electrode 43B, on the top of the pillar structure 45. This is because, as will be described later, in a step of forming the alignment film 44, the alignment film 44 is formed to be not thick at least on the portion in the sensor electrode 43B, on the top of the pillar structure 45, by utilizing low wettability of the pillar structure 45 due to its thickness.

The pillar structure 56 is arranged on the opposing face 50A side of the facing substrate 50. Specifically, the pillar structure 56 is in contact with the planarization film 53, and the facing electrode 54 is arranged on the top and the side face of the pillar structure 56. That is, in the first embodiment, the pillar structure 56 is covered with the facing electrode 54. Here, as described above, similarly to the case of the array substrate 40, the alignment film 55 is formed on the opposing face 50A in the facing substrate 50. However, the alignment 55 is hardly formed, or is not formed at all at least on a portion in the facing electrode 54, on the top of the pillar structure 56. This is because, as will be described later, in the step of forming the alignment film 55, the alignment film 55 is formed to be not thick at least on the portion in the facing electrode 54, on the top of the pillar structure 56, by utilizing low wettability of the pillar structure 56 due to its thickness.

The pillar structures 45 and 56 face each other with a predetermined gap in between, along a normal to the opposing face 40A in the array substrate 40 and the opposing face 50A in the facing substrate 50, respectively. In the plurality of pillar structures 45 and 56, a pair of the pillar structure 45 and the pillar structure 56 facing each other along the normal to the opposing face 40A and the opposing face 50A, respectively, each have the size so that the top of the pillar structure 45 and the top of the pillar structure 56 are directly or indirectly contact with each other, when the facing substrate 50 is flexed to the array substrate 40 side due to the external pressure caused by the touch of the user's finger or pen on the screen.

The pillar structures 45 and 56 are made of, for example, NN type material or PC type material manufactured by JSR Cooperation. The height of each of the pillar structures 45 and 56 is higher than that of the convex-concavo formed on the surface of the planarization film 42. For example, in the case where the convex-concavo with the height of approximately 0.5 μm to 1 μm is formed on the surface of the planarization film 42, the height of each of the pillar structures 45 and 56 is 1 μm or more.

The cross section of each of the pillar structures 45 and 56 may be in, for example, a trapezoidal shape as illustrated in FIG. 2, a quadrangle shape, a semicircular shape, or the like. The top (cross section in the stacked plane direction) of each of the pillar structures 45 and 56 may be in, for example, a perfect circular shape, the polygonal shape such as the quadrangle shape and a hexagonal shape, or an oblate shape having a long axis, such as a rectangle shape and a elliptic shape. Moreover, the top (cross section in the stacked plane direction) of each of the pillar structures 45 and 56 may be in, for example, a long and thin linear shape, or a matrix shape in which a plurality of long and thin lines intersect each other.

The top (in-plane of the top) of each of the pillar structures 45 and 56 may be in, for example, a planarized shape parallel to the stacked plane, or a convex shape (curved shape). However, from the viewpoint of setting wettability of the alignment films 44 and 55 low, the top of each of the pillar structures 45 and 56 is preferably in the convex shape (curved shape). Irrespective of the in-plane shape of the top of each of the pillar structures 45 and 56, it is also possible to set the wettability of the alignment films 44 and 55 low by increasing the height of the pillar structures 45 and 56, respectively. Moreover, in consideration of alignment accuracy of the pillar structure 45 and the pillar structure 56, the top of each of the pillar structures 45 and 56 is preferably in a planarized face parallel to the stacked plane. Moreover, irrespective of the in-plane shape of the top of each of the pillar structures 45 and 56, it is possible to improve the alignment accuracy of the pillar structure 45 and the pillar structure 56 by increasing the area of the top of one of the pillar structures 45 and 56.

For example, the accuracy when the array substrate 40 and the facing substrate 50 are bonded to each other, and the process accuracy such as the alignment accuracy which is necessary at the time of the patterning are added, and regarded as ±a. The diameter of the top of one of the pillar structures 45 and 56 is regarded as b. At this time, the diameter of the top of the other of the pillar structures 45 and 56 is necessarily at least 2a+b.

However, when the area of the tops of the pillar structures 45 and 56 is increased too much, the wettability of the alignment films 44 and 55 improves, unless the tops of the pillar structures 45 and 56 are in extremely-oblate shapes. Thus, in the case where the height of the pillar structures 45 and 56 is small, the area of the tops of the pillar structures 45 and 56 is preferably small to a certain level, in comparison with the case where the height of the pillar structures 45 and 56 is large. Therefore, in the case where the tops of the pillar structures 45 and 56 are not in the extremely-oblate shapes, when the wettability of the alignment films 44 and 55 is desired to be low, and the alignment accuracy of the pillar structure 45 and the pillar structure 56 is desired to be assured, it is preferable to take the following way. Hereafter, in the plurality of pillar structures 45 and 56, the description will be made on the pair of pillar structures 45 and 56 facing each other along the normal to the opposing faces 40A and 50A.

For example, the height of the pillar structures 45 and 56 is different from each other, and the area of the top of one of the pillar structures 45 and 56, whose height is smaller, is preferably smaller than that of the top of the other of the pillar structures 45 and 56, whose height is larger. For example, the height of the pillar structures 45 and 56 is different from each other, and the top of one of the pillar structures 45 and 56, whose height is larger, is preferably in the planarized shape parallel to the stacked plane, and the top of the other of the pillar structures 45 and 56, whose height is smaller, is preferably in the convex shape (curved shape). For example, in the case where the tops of both of the pillar structures 45 and 56 are in shapes different from a perfect circle, the height of the pillar structures 45 and 56 is different from each other, and the width in the short side direction of the top of one of the pillar structures 45 and 56, whose height is smaller, is preferably smaller than that in the short side direction of the top of the other of the pillar structures 45 and 56, whose height is larger.

In the case where the tops of the pillar structures 45 and 56 are in the extremely-oblate shapes, that is, in the case where the width in the short side directions of the tops is small, even when the area of the tops is large, it is possible to maintain the wettability of the alignment films 44 and 55 low. Therefore, in the case where the top of one of the pillar structures 45 and 56 is in the extremely-oblate shape, for example, in a long and thin elliptic shape, a long and thin polygonal shape, or the long and thin linear shape, in the top of one of the pillar structures 45 and 56, whose top is in the extremely-oblate shape, the wettability of the alignment film 44 or the alignment film 55 may be maintained low, even when the top with the small height is parallel to the stacked plane.

In the case where the tops of both of the pillar structures 45 and 56 are not in the perfect circle shapes or the shapes close to the perfect circles, that is, in the case where the tops of both of the pillar structures 45 and 56 has long axes in the in-plane direction, in the plurality of pillar structures 45 and 56, the long axis directions of the tops of the pair of pillar structures 45 and 56 facing each other along the normal to the opposing faces 40A and 50A preferably intersect (are orthogonal to) each other. Thereby, irrespective of the in-plane shape of the tops of the pillar structures 45 and 56, the alignment accuracy of the pillar structure 45 and the pillar structure 56 may improve.

Figure 3:
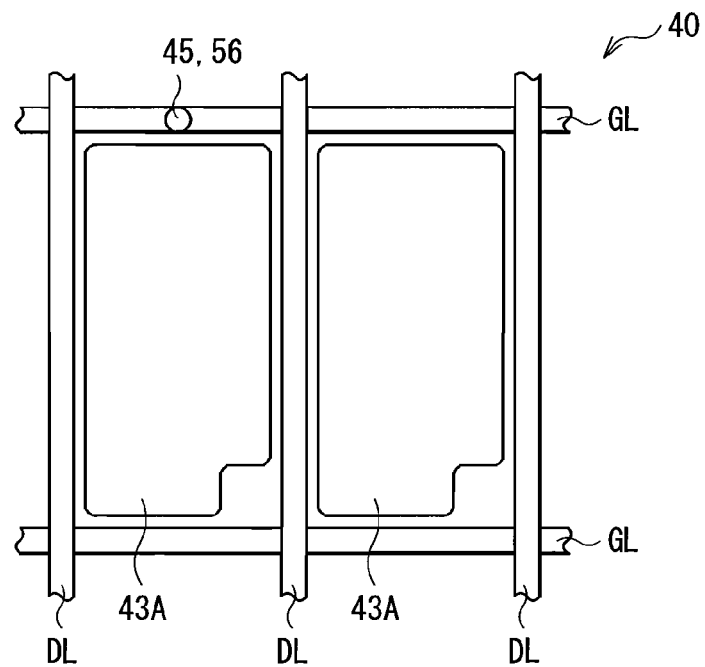
FIG. 3 is a top view illustrating an example of the configuration of an array substrate in FIG. 1.
Figure 4:
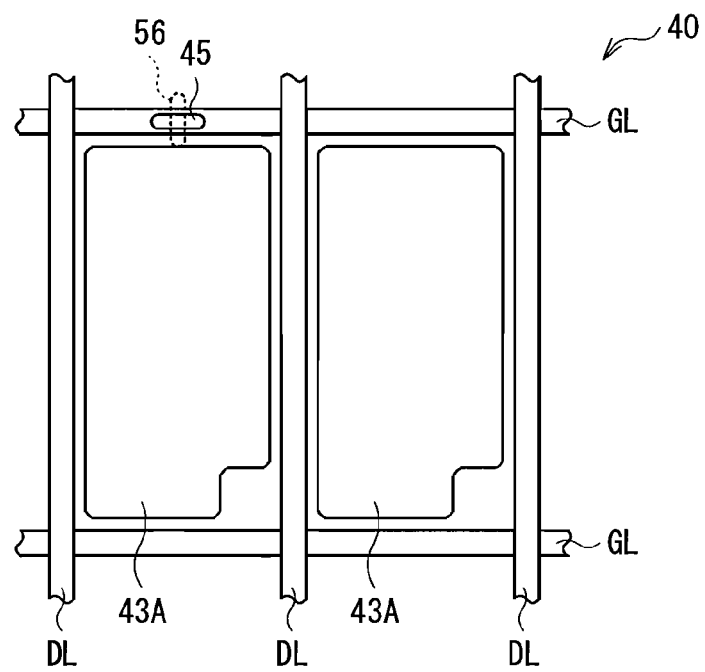
FIG. 4 is a top view illustrating another example of the configuration of the array substrate in FIG. 1.
Figure 5:
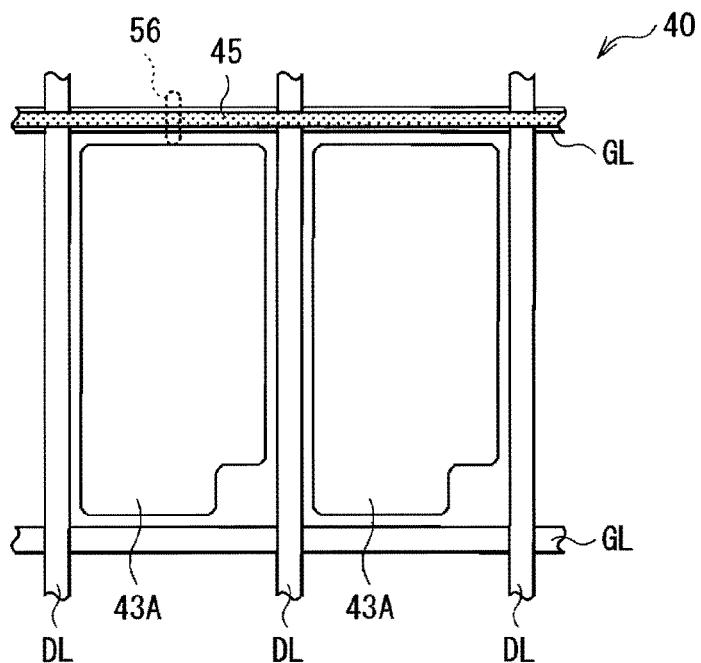
FIG. 5 is a top view illustrating still another example of the configuration of the array substrate in FIG. 1.

The pillar structures 45 and 56 are each preferably arranged in a region (so-called light shielding region) where, in the liquid crystal panel 10, the light emitted from the backlight 20 does not transmit. The light shielding region corresponds to, for example, a non-facing region which does not face the pixel electrode 43A in FIG. 3. As illustrated in FIG. 3, for example, the pillar structures 45 and 56 may be arranged on the gate line GL in the array substrate 40. Alternatively, although not illustrated in the figure, the pillar structures 45 and 56 may be arranged on the signal line DL. In the case where the pillar structures 45 and 56 have the tops with shapes different from the perfect circle and the long axis directions different from each other, the pillar structures 45 and 56 are preferably arranged in the light shielding region in the liquid crystal panel 10, from the viewpoint of suppressing the reduction in the opening ratio due to the pillar structures 45 and 56. As illustrated in FIG. 4, for example, the pillar structure 45 is preferably arranged on the gate line GL, and preferably has the top in the elliptic shape or the polygonal shape extending in the extending direction of the gate line GL. Moreover, the pillar structure 56 preferably has the top in the elliptic shape extending in the direction intersecting (orthogonal to) the extending direction of the pillar structure 45. As illustrated in FIG. 5, for example, the pillar structure 45 is preferably arranged on the gate line GL, and preferably has the top in the linear shape extending in the extending direction of the gate line GL. Moreover, the pillar structure 56 preferably has the top in the elliptic shape or the polygonal shape extending in the direction intersecting (orthogonal to) the extending direction of the pillar structure 45.

Backlight 20

The backlight 20 includes, for example, a direct type light source in which a plurality of linear light sources are arranged in series at regular intervals (for example, intervals of 20 mm). The linear light source is typically a cold cathode fluorescent lamp (CCFL). However, the linear light source may be a type in which point-like light sources such as light emitting diodes (LEDs) are arranged in a straight line shape. Immediately above the light source, the backlight 20 includes, for example, an optical sheet in which a diffusion plate, a diffusion sheet, a prism sheet, a reflective polarizing element, and the like are arranged in this order from the light source side. The backlight 20 may be a side edge type using a light guide plate.

Operation and Effects of the Liquid Crystal Display Device 1

Next, the operation and the effects of the liquid crystal display device 1 according to the first embodiment will be described.

The light emitted from the backlight 20 enters the back face of the liquid crystal panel 10, and then is modulated in response to the magnitude of the voltage applied for each pixel in the liquid crystal panel 10. The modulated light is separated into colors with the color filter 52, and then emitted to the observer side. Thus, the image is formed on the front face of the panel. In this manner, the image is displayed in the liquid crystal display device 1.

In a sensor-mounted liquid crystal panel of the related art, for example, as described in Japanese Unexamined Patent Publication No. 2007-95044, a projection with a height smaller than that of a spacer is provided on a facing substrate, and an electrode covers the projection. A top electrode and a bottom electrode are electrically connected to each other, thereby position detection is performed. However, there are alignment films on surfaces of the electrodes used at the time of the position detection. The alignment films are usually made of insulating material. Thus, when the top electrode and the bottom electrode are contact with each other due to external pressure, contact sensitivity is low since the alignment films intervene between the top electrode and the bottom electrode, and it is necessary to strongly press a contact face with a finger, a pen, or the like. Moreover, when the contact with the finger, the pen, or the like is repeated, the alignment film on the electrode is damaged, and may be peeled off. As a result, there are risks that alignment failure occurs, and the peeled-off alignment film floats in liquid crystal so that display failure occurs. Reliability of the repeated use is low.

To solve such issues, for example, in Japanese Unexamined Patent Publication No. 2007-52368, it is proposed to remove the portions in contact with each other at the time of position detection, in one or both of the alignment film on the facing substrate side, and the alignment film on the array substrate side. However, to use the method of Japanese Unexamined Patent Publication No. 2007-52368, it is necessary to separately perform the step of removing the alignment film. In Japanese Unexamined Patent Publication No. 2007-52368, as the method of removing the alignment film, solvent is applied with an inkjet, and the alignment film is dissolved before being burned. However, in the case where such a method is used, reduction in the yield rate is caused by various issues such as bleeding of the solvent, an issue of position accuracy, an increase in manufacture cost, reduction in throughput, and splash of the solvent.

A device like an inkjet is not used during the typical manufacture process of the liquid crystal. Thus, existing equipment may not be diverted, and new equipment investment is necessary. For removing the alignment film, it is considered to select another process such as lithography. However, since the number of steps increases, reduction in productivity, and the increase in manufacture cost are brought. In terms of characteristics, since a margin is necessary when removing the alignment film, the opening ratio decreases. In terms of reliability, influence on reliability against burning or the like, reduction in flexibility of material for the alignment film, or the like is concerned.

On the other hand, in the liquid crystal display device 1 according to the first embodiment, on the opposing faces 40A and 50A in the pair of the array substrate 40 and the facing substrate 50 facing each other with the liquid crystal layer 60 in between, respectively, the sensor structure including the pillar structures 45 and 56 is provided, in addition to the spacer 46 determining the space between the array substrate 40 and the facing substrate 50. The pillar structures 45 and 56 face each other with the predetermined gap in between, along the normal to the opposing faces 40A and 50A. Thereby, when the facing substrate 50 is flexed to the liquid crystal layer 60 side with the external pressure, an immediately-above portion 43C which is immediately above the pillar structure 45, in the sensor electrode 43B, and an immediately-below portion 55A which is immediately below the pillar structure 56, in the facing electrode 54 are in contact with each other. Thereby, in the liquid crystal panel 10, it is possible to maintain the durability against the external pressure, and it is possible to perform the position detection as well.

Here, the portions (the immediately-above portion 43C and the immediately-below portion 55A) in contact with each other with the external pressure are arranged in the positions higher than the other portions in the sensor electrode 43B and the facing electrode 54, by the height of the pillar structures 45 and 56, respectively. Thus, when forming the alignment films 44 and 55, even when the alignment films 44 and 55 are applied over the whole surface, the wettability of the immediately-above portion 43C and the immediately-below portion 55A is low. As a result, on the immediately-above portion 43C and the immediately-below portion 55A, the alignment films 44 and 55 are hardly formed, or are not formed at all, respectively. Therefore, since there is almost no damage, or there is no damage at all on the alignment films due to the external pressure, reliability of the repeated use is high. Moreover, as described above, since the alignment films 44 and 55 are hardly formed, or not formed at all in the contact portions, it is unnecessary to purposely remove a part of the alignment films 44 and 55. Thereby, it is possible to eliminate generation of failure due to the process of removing the alignment films 44 and 55.

In this manner, in the first embodiment, the reliability of the repeated use is high, and it is possible to eliminate generation of failure due to the process of removing the alignment films 44 and 55. Therefore, it is possible to suppress reduction in the reliability against the external pressure without reducing the yield rate.

Moreover, since the alignment films 44 and 55 are hardly formed, or not formed at all in the contact portions, the contact resistance of the sensor electrode 43B and the facing electrode 54 is low, and the sensitivity is high as the sensor. Scaling off of the alignment film caused by the repeated use, and the magnitude of the contact resistance are a matter of degree. Therefore, even in the case where the alignment films 44 and 55 slightly remain in the contact portions, when the failure and the increase in the resistance caused by peeling off of the alignment films 44 and 55 are slight to the degree that they are ignorable, it is not an issue.

Modification

Figure 6:
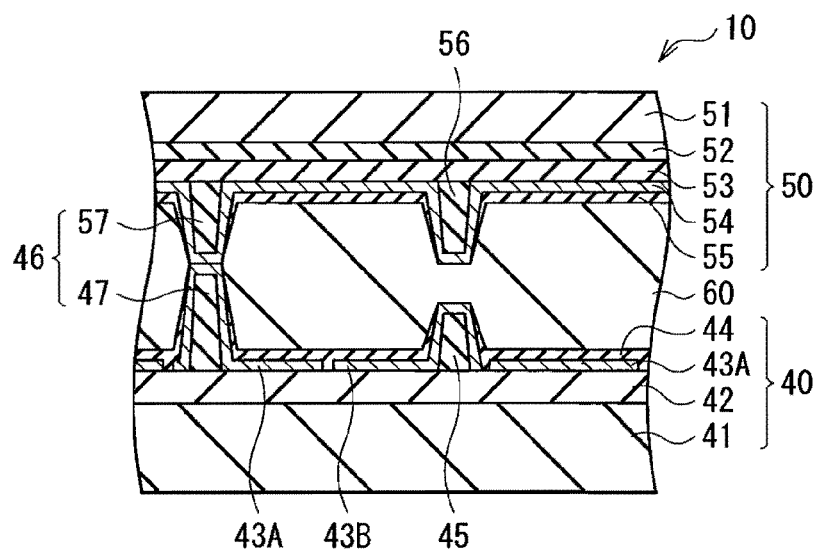
FIG. 6 is a cross sectional view illustrating another example of the configuration of the liquid crystal panel in FIG. 1.

In the first embodiment, although the spacer 46 is configured with a single structure, the spacer 46 may be configured with a plurality of structures. For example, as illustrated in FIG. 6, the spacer 46 may have the configuration in which a spacer 47 (second pillar structure) arranged on the array substrate 40 side, and a spacer 57 (second pillar structure) arranged on the facing substrate 50 side are stacked on each other. At this time, the top of the spacer 47 and the top of the spacer 57 are in indirectly contact with each other. Moreover, in the spacer 46, the spacer 47 on the array substrate 40 side is preferably in contact with the planarization film 42, and the pixel electrode 43A is preferably provided on the surface of the spacer 47. Moreover, in the spacer 46, the spacer 57 on the facing substrate 50 side is preferably in contact with the planarization film 53, and the facing electrode 54 is preferably provided on the surface of the spacer 57. That is, the configuration of the structure determining the space between the array substrate 40 and the facing substrate 50 is preferably similar to that of the sensor structure. In such a case, the spacer 47 and the pillar structure 45 may be formed in the same forming step, and the spacer 57 and the pillar structure 56 may be formed in the same forming step, thereby the productivity improves. Moreover, in the case where the spacer 47 and the pillar structure 45 are formed in the same step, and the spacer 57 and the pillar structure 56 are formed in the same step, the relative height thereof may be easily controlled. Thus, even when the gap between the pillar structure 45 and the pillar structure 56 is small, the reduction and the variation in the sensor sensitivity may be eliminated.

Figure 7:
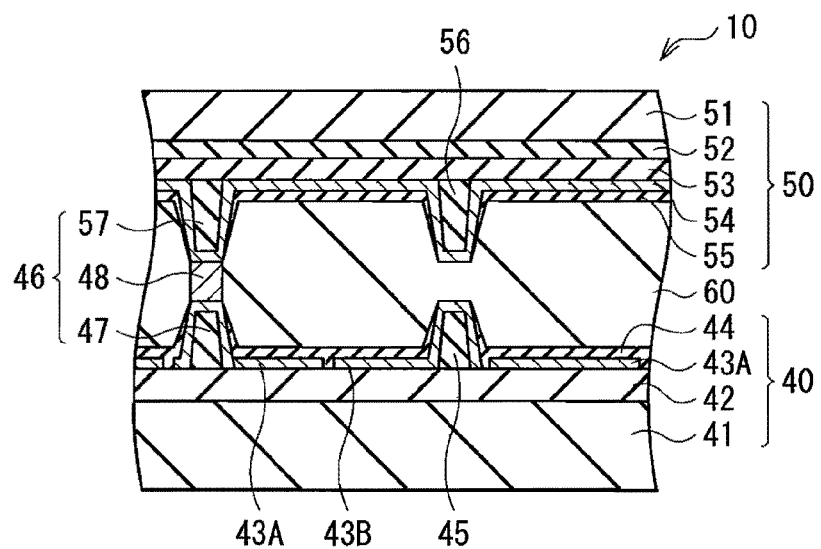
FIG. 7 is a cross sectional view illustrating still another example of the configuration of the liquid crystal panel in FIG. 1.
Figure 8:
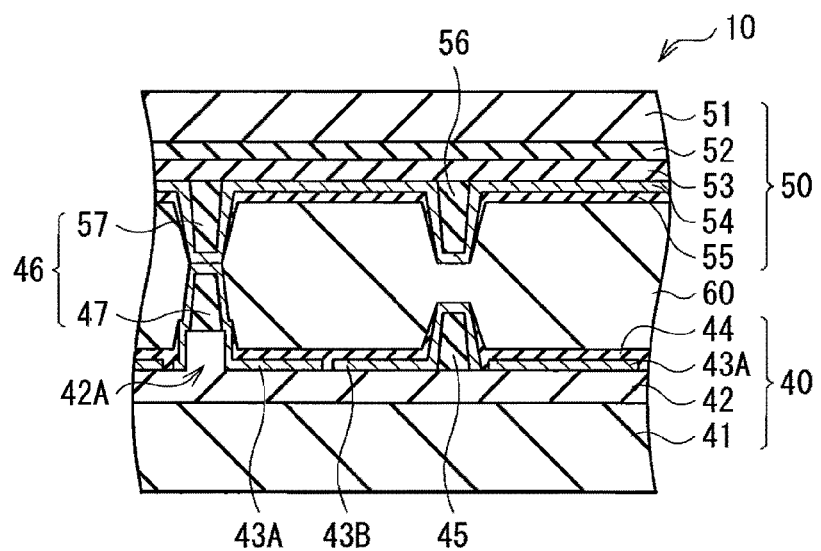
FIG. 8 is a cross sectional view further illustrating still another example of the configuration of the liquid crystal panel in FIG. 1.
Figure 9:
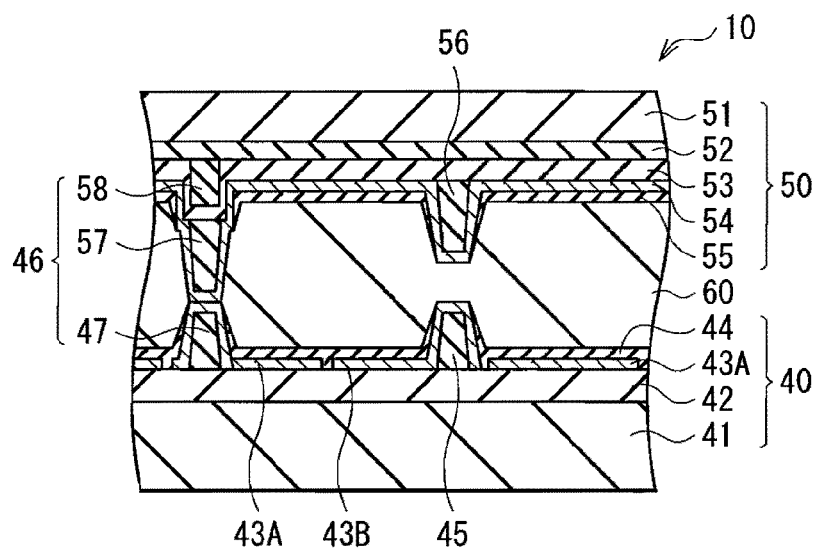
FIG. 9 is a cross sectional view further illustrating still another example of the configuration of the liquid crystal panel in FIG. 1.

FIG. 6 illustrates an example of the case where there is a difference between the height of the pillar structure 45 and the height of the spacer 47. In the case where there is such a height difference, for example, when forming one (pillar structure 45 in FIG. 6) of the pillar structure 45 and the spacer 47, whose height is smaller, it is necessary to provide a step of adjusting (reducing) the height. For example, in the case where is it desired to eliminate the step of adjusting the height, for example, as illustrated in FIG. 7, the pillar structure 45 and the spacer 47 are formed to be on the same height level, and the pixel electrode 43A and the sensor electrode 43B are formed. After that, an adjusting layer 48 for adjusting the height may be formed on the spacer 47. Alternatively, for example, as illustrated in FIG. 8, when forming the planarization film 42, the portion where the spacer 47 is to be formed is formed to be slightly higher than the other portion in the planarization film 42, and the spacer 47 on the same height level as that of the pillar structure 45 may be formed in the portion (42A) which is slightly higher than the other portion in the planarization film 42. Alternatively, for example, as illustrated in FIG. 9, an adjusting layer 58 for adjusting the height is formed in the portion where the spacer 57 is to be formed, and then the planarization film 53 is formed over the whole surface of the adjusting layer 58. The planarization film 53 is projected in the portion immediately above the adjusting layer 58, and the spacer 57 on the same height level as that of the pillar structure 56 may be formed on the projected portion.

Figure 10:
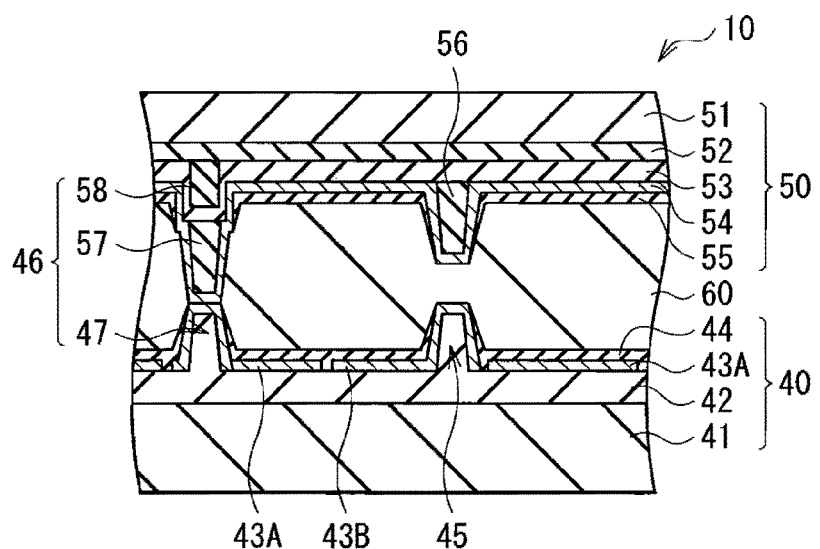
FIG. 10 is a cross sectional view further illustrating still another example of the configuration of the liquid crystal panel in FIG. 1.

In the first embodiment, the case where the pillar structure 45 and the spacer 47 are formed separately from the planarization film 42 as the base is indicated as an example. However, for example, as illustrated in FIG. 10, the pillar structure 45 and the spacer 47 may be integrally formed with the planarization film 42, with the material similar to that of the planarization film 42. In this case, after the planarization film 42 having the large thickness is formed, the pillar structure 45 may be formed by scaling off the surface of the planarization film 42. In the case where the pillar structure 45 is formed immediately above the gate line GL and the signal line DL, for example, the pillar structure 45 may be formed by increasing the height of the gate line GL or the height of the signal line DL, or by using material which has slightly low planarity as the material for the planarization film 42.

Second Embodiment

Figure 11:
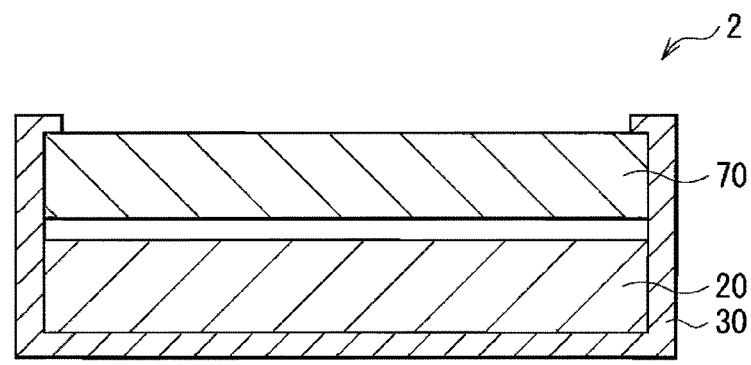
FIG. 11 is a cross sectional view illustrating an example of the configuration of the liquid crystal display device according to a second embodiment of the present invention.

FIG. 11 illustrates an example of the schematic configuration of a liquid crystal display device 2 according to a second embodiment of the present invention. The liquid crystal display device 2 differs from the liquid crystal display device 1 according to the first embodiment in that the liquid crystal display device 2 includes a liquid crystal panel 70, in substitution for the liquid crystal panel 10 in the first embodiment. Hereafter, the description will be made mainly on the difference from the first embodiment, and the description on points common to the first embodiment will be appropriately omitted.

Similarly to the liquid crystal panel 10 according to the first embodiment, the liquid crystal panel 70 includes the pillar structures 45 and 56, and the spacer 46. Similarly to the first embodiment, the spacer 46 determines the space between the array substrate 40 and the facing substrate 50. On the other hand, the sensor electrode 43B and the facing electrode 54 are not provided immediately above the pillar structures 45 and 56, respectively. The part including the pillar structures 45 and 56 does not constitute the sensor structure. That is, the liquid crystal panel 70 according to the second embodiment is not the sensor-mounted panel, but merely a pressure-resistant panel.

In recent years, due to variety and low profile of the design of the liquid crystal display device, and optical characteristics, the configuration in which the cover is directly bonded to the liquid crystal panel without an air gap in between, and the configuration called windowless in which the liquid crystal panel is bare without the cover itself have been employed. Thus, high pressure is applied directly on the liquid crystal panel. Moreover, the thickness of glass in the liquid crystal panel is reduced, and the amount of deformation of the liquid crystal panel increases due to the external pressure, thereby it is necessary to intensify the internal structure of the liquid crystal panel. Therefore, like the second embodiment, it is important to use the pressure-resistant liquid crystal panel 70 in the liquid crystal display device 2.

In the second embodiment, the top of the pillar structure 45 and the top of the pillar structure 56 are not covered with the sensor electrode 43B and the facing electrode 54, respectively, and are in contact with the liquid crystal layer 60. On the top of the pillar structure 45 and the top of the pillar structure 56, the alignment films 44 and 55 are hardly formed, or not formed at all, respectively. That is, between the top of the pillar structure 45 and the top of the pillar structure 56, there is only the liquid crystal layer 60, or there are slightly the alignment films 44 and 55, in addition to the liquid crystal layer 60. Similarly to the first embodiment, this is because, in the step of forming the alignment film 44, the alignment films 44 is formed to be not thick at least on a portion in the sensor electrode 43B, on the top of the pillar structures 45, by utilizing low wettability of the pillar structures 45 due to its thickness. In the step of forming the alignment film 55, the alignment film 55 is formed to be not thick at least on a portion in the facing electrode 54, on the top of the pillar structure 56, by utilizing low wettability of the pillar structure 56 due to its thickness.

Figure 12:
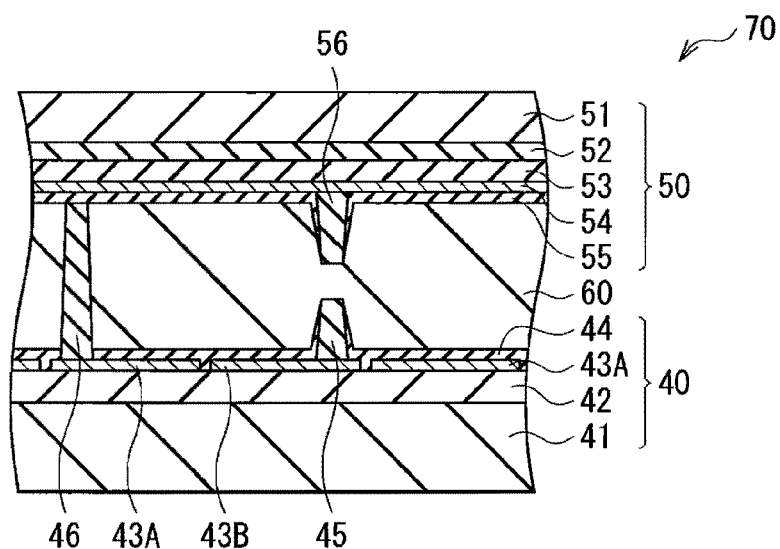
FIG. 12 is a cross sectional view illustrating an example of the configuration of the liquid crystal panel in FIG. 11.

For example, as illustrated in FIG. 12, the sensor electrode 43B and the facing electrode 54 are formed immediately below the pillar structures 45 and 56, respectively. Thereby, with elastic deformation of the pillar structures 45 and 56 caused by the external pressure, the risk where breaking of the sensor electrode 43B and the facing electrode 54 which have low elastic deformability occurs may be eliminated. In the case where breaking of the sensor electrode 43B and the facing electrode 54 is not really an issue, one of the sensor electrode 43B and the facing electrode 54 may be formed on the top of the pillar structure 45 or the pillar structure 56. In the case where the sensor electrode 43B and the facing electrode 54 are not formed on the surfaces including the top of the pillar structure 45 and the top of the pillar structure 56, respectively, the pillar structures 45 and 56 are preferably formed with the material having low wettability to the material used for the alignment films 44 and 55.

In the liquid crystal display device 2 according to the second embodiment, on the opposing faces 40A and 50A in the pair of the array substrate 40 and the facing substrate 50 facing each other with the liquid crystal layer 60 in between, the pressure-resistant structure including the pillar structures 45 and 56 is provided, in addition to the spacer 46 determining the space between the array substrate 40 and the facing substrate 50. The pillar structures 45 and 56 face each other with the predetermined gap in between, along the normal to the opposing faces 40A and 50A, respectively. Thereby, when the facing substrate 50 is flexed to the liquid crystal layer 60 side due to the external pressure, the immediately-above portion 43C which is immediately above the pillar structure 45, in the sensor electrode 43B, and the immediately-below portion 55A which is immediately below the pillar structure 56, in the facing electrode 54 are in contact with each other. Thereby, in the liquid crystal panel 70, it is possible to maintain the durability against the external pressure.

Here, the top of the pillar structure 45 and the top of the pillar structure 56, or the portion immediately above the pillar structure 45 and the portion immediately above the pillar structure 56, that is, the portions in contact with each other (hereafter, simply referred to as contact portions) due to the external pressure are arranged in the positions higher than the other portions, by the height of the pillar structures 45 and 56, respectively. Thus, when forming the alignment films 44 and 55, even when the alignment films 44 and 55 are applied over the whole surface, the wettability of the contact portions is low. As a result, in the contact portions, the alignment films 44 and 55 are hardly formed, or are not formed at all. Therefore, since there is almost no damage, or there is no damage at all on the alignment films due to the external pressure, reliability of the repeated use is high. Moreover, as described above, since the alignment films 44 and 55 are hardly formed, or not formed at all in the contact portions, it is unnecessary to purposely remove a part of the alignment films 44 and 55. Thereby, it is possible to eliminate generation of failure due to the process of removing the alignment films 44 and 55.

In this manner, in the second embodiment, the reliability of the repeated use is high, and it is possible to eliminate generation of failure due to the process of removing the alignment films 44 and 55. Therefore, it is possible to suppress reduction in the reliability due to the external pressure without reducing the yield rate.

Modification

Figure 13:
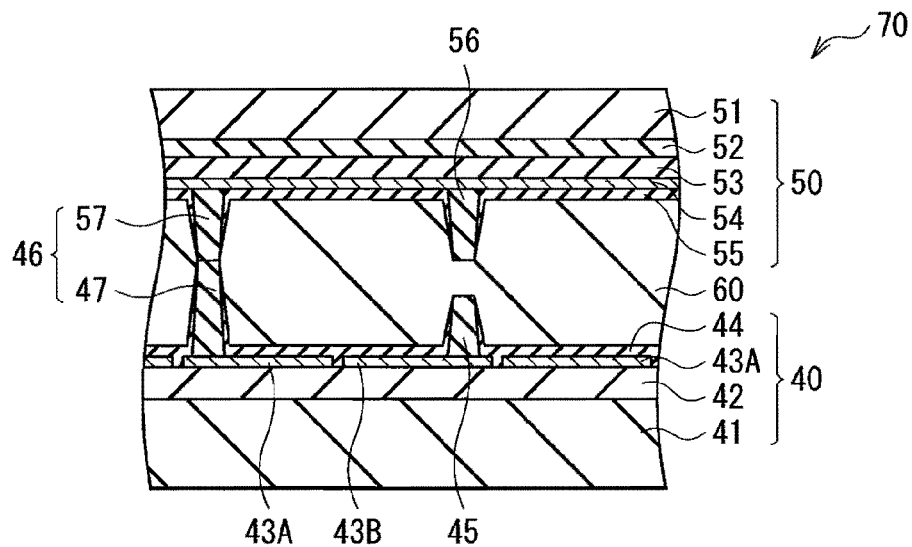
FIG. 13 is a cross sectional view illustrating another example of the configuration of the liquid crystal panel in FIG. 11.

In the second embodiment, the spacer 46 is configured with a single structure. However, the spacer 46 may be configured with a plurality of structures. For example, as illustrated in FIG. 13, the spacer 46 may have the configuration in which the spacer 47 arranged on the array substrate 40 side, and the spacer 57 arranged on the facing substrate 50 side are stacked on each other. At this time, the top of the spacer 47 and the top of the spacer 57 are directly or indirectly in contact with each other. Moreover, in the spacer 46, the spacer 47 on the array substrate 40 side is preferably in contact with the pixel electrode 43A (that is, formed on the plane similar to that of the pillar structure 45). Moreover, in the spacer 46, the spacer 57 on the facing substrate 50 side is preferably in contact with the facing electrode 54 (that is, formed on the plane similar to that of the pillar structure 56). That is, the configuration of the structure determining the space between the array substrate 40 and the facing substrate 50 is preferably similar to that of the pressure-resistant structure. In such a case, the spacer 47 and the pillar structure 45 may be formed in the same forming step, and the spacer 57 and the pillar structure 56 may be formed in the same forming step, thereby the productivity may improve. Moreover, in the case where the spacer 47 and the pillar structure 45 are formed in the same step, and the spacer 57 and the pillar structure 56 are formed in the same step, the relative height thereof may be easily controlled, and the variation in the pressure resistance capability may be eliminated.

Figure 14:
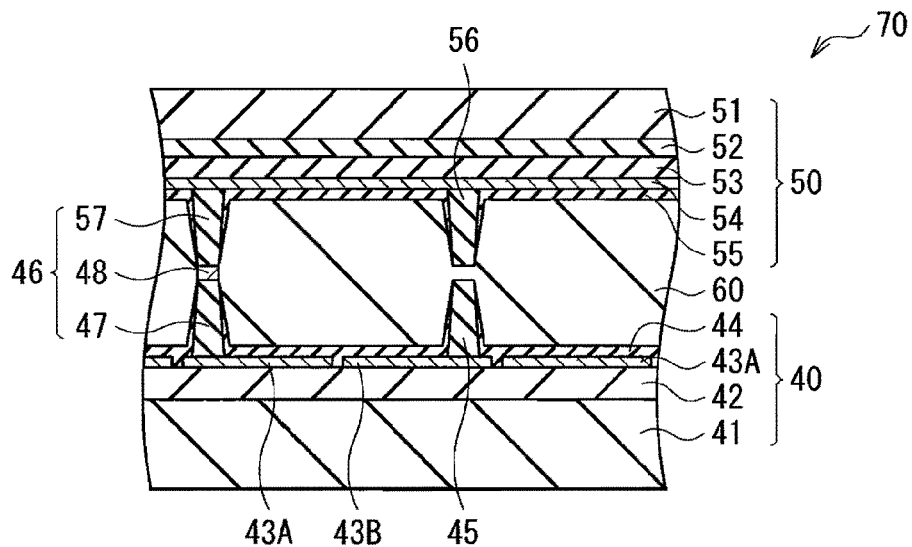
FIG. 14 is a cross sectional view illustrating still another example of the configuration of the liquid crystal panel in FIG. 11.
Figure 15:
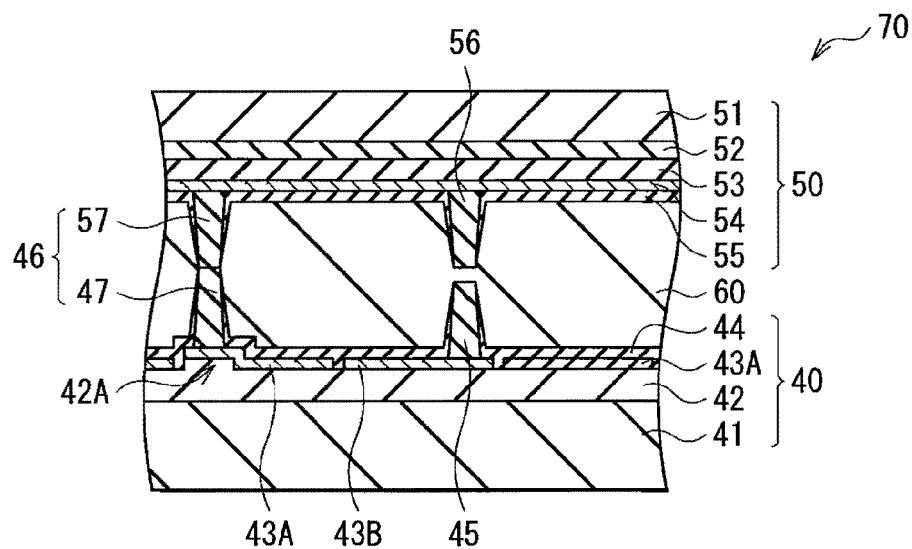
FIG. 15 is a cross sectional view further illustrating still another example of the configuration of the liquid crystal panel in FIG. 11.
Figure 16:
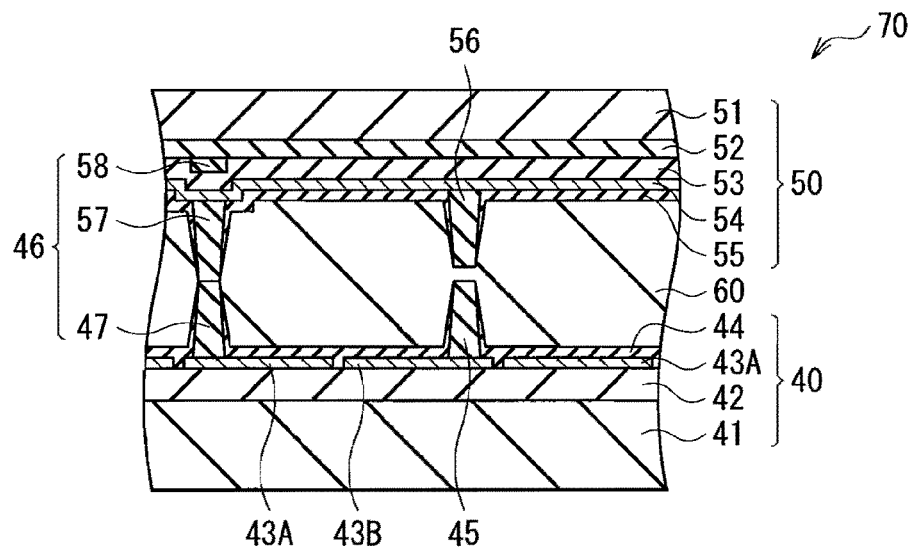
FIG. 16 is a cross sectional view further illustrating still another example of the configuration of the liquid crystal panel in FIG. 11.

FIG. 13 illustrates an example of the case where there is a difference between the height of the pillar structure 45 and the height of the spacer 47. In the case where there is such a height difference, for example, when forming one (pillar structure 45 in FIG. 13) of the pillar structure 45 and the height of the spacer 47, whose height is smaller, it is necessary to provide a step of adjusting (reducing) the height. For example, in the case where it is desired to eliminate the step of adjusting the height, for example, as illustrated in FIG. 14, the pillar structure 45 and the spacer 47 are formed to be on the same height level. After that, the adjusting layer 48 for adjusting the height may be formed on the spacer 47. Alternatively, for example, as illustrated in FIG. 15, when forming the planarization film 42, the portion where the spacer 47 is to be formed is formed to be slightly higher than the other portion in the planarization film 42, and, for example, the pixel electrode 43A is formed on the portion (42A) which is slightly higher than the other portion. Then, on the pixel electrode 43A on the slightly-higher portion (42A), the spacer 47 on the same height level as that of the pillar structure 45 may be formed. Alternatively, for example, as illustrated in FIG. 16, the adjusting layer 58 for adjusting the height is formed in the portion where the spacer 57 is to be formed, and then the planarization film 53 is formed over the whole surface of the adjusting layer 58. The planarization film 53 is projected in the portion immediately above the adjusting layer 58, and, for example, the facing electrode 54 is formed on the projected portion. On the facing electrode 54, the spacer 57 on the same height level as that of the pillar structure 56 may be formed.

Figure 17:
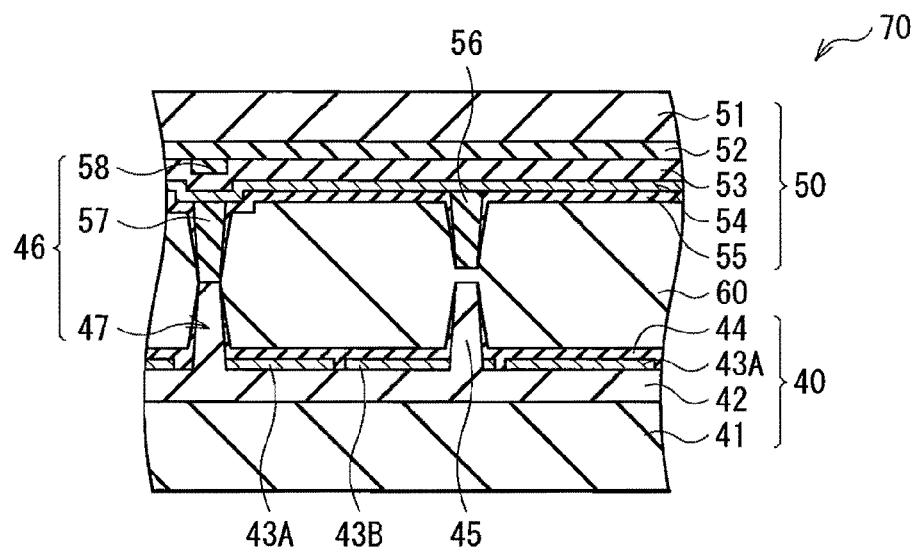
FIG. 17 is a cross sectional view further illustrating still another example of the configuration of the liquid crystal panel in FIG. 11.

In the second embodiment, the case where the pillar structure 45 and the spacer 47 are formed separately from the planarization film 42 as the base is indicated as an example. However, for example, as illustrated in FIG. 17, the pillar structure 45 and the spacer 47 may be integrally formed with the planarization film 42, with the material similar to that of the planarization film 42. In this case, after the planarization film 42 having the large thickness is formed, the pillar structure 45 may be formed by scaling off the surface of the planarization film 42. In the case where the pillar structure 45 is formed immediately above the gate line GL and the signal line DL, for example, the pillar structure 45 may be formed by increasing the height of the gate line GL or the height of the signal line DL, or by using the material which has slightly low planarity as the material for the planarization film 42.

Hereinbefore, although the present invention is described with the first and the second embodiments, and the modifications, the present invention is not limited to these embodiments or the like, and various modifications may be made.

For example, in the embodiments or the like, the case where the top of the liquid crystal panel 10 is exposed to the outside is described as an example. However, some kind of sheet or the like may be provided on the top of the liquid crystal panel 10.

Figure 18:
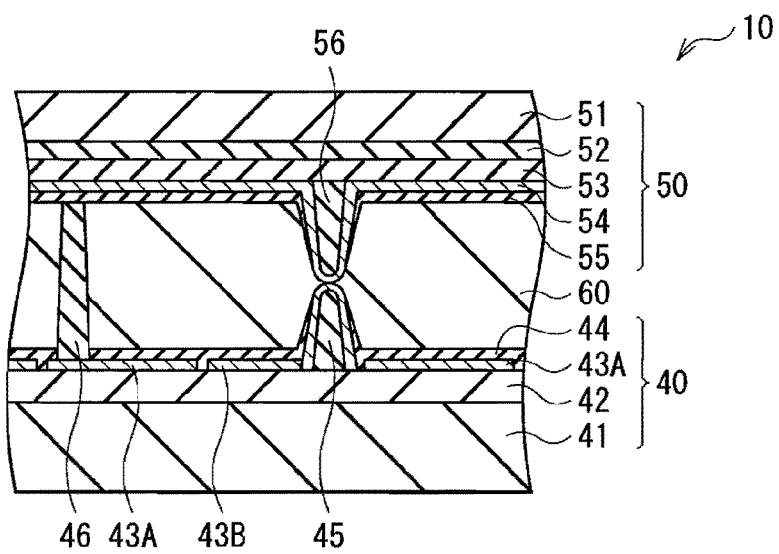
FIG. 18 is a cross sectional view further illustrating still another example of the configuration of the liquid crystal panel in FIG. 1.

In the embodiments or the like, the pillar structures 45 and 56 face each other with the predetermined gap in between, along the normal to the opposing faces 40A and 50A. However, for example, as illustrated in FIG. 18, the pillar structures 45 ad 56 may be in contact with each other with the sensor electrode 43B and the facing electrode 54 in between. Also in such a case, when the facing substrate 50 is flexed to the array substrate 40 side due to the external pressure, the contact area of the sensor electrode 43B and the facing electrode 54 changes, and the resistance also changes with the change of the contact area. Thus, by detecting that change, it is possible to perform the position detection.

The change of the contact area is generated with elastic deformation of the pillar structures 45 and 56. Therefore, in the case where the position detection is performed by utilizing the change of the contact area, one or both of the sensor electrode 43B and the facing electrode 54 has preferably the configuration where the change amount of the contact area increases due to the external pressure. For example, one or both of the pillar structures 45 and 56 is preferably made of material which is easily elastically deformed, or preferably has a convex-shaped curved face. The convex-shaped curved face may be made by using material which is easily thermally reflowed for forming the pillar structures 45 and 56, or by forming the pillar structures 45 and 56 small. In the case where the position detection is performed by utilizing the change of the contact area, from the viewpoint of deformability and durability, one or both of the sensor electrode 43B and the facing electrode 54 is preferably formed with conductive resin. In the case where one of the sensor electrode 43B and the facing electrode 54 is formed with conductive resin, the area of the top of the sensor electrode 43B or the facing electrode 54, which is made of conductive resin, is preferably larger than the area of the top of the sensor electrode 43B or the facing electrode 54, which is not made of conductive resin. Thereby, the change amount of the contact area due to the external pressure may be increased.

Figure 19:
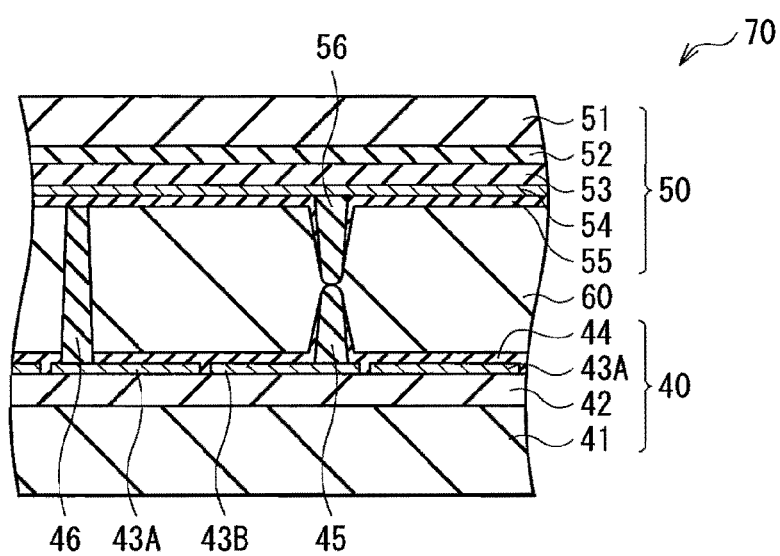
FIG. 19 is a cross sectional view further illustrating still another example of the configuration of the liquid crystal panel in FIG. 11.

For example, as illustrated in FIG. 19, the top of the pillar structure 45 and the top of the pillar structure 56 may be directly in contact with each other. Even in such a case, when the facing substrate 50 is flexed to the array substrate 40 side due to the external pressure, the pillar structures 45 and 56 are elastically deformed. Thus, in the liquid crystal panel 70, it is possible to maintain the durability to the external pressure. From the viewpoint of maintaining the durability to the external pressure, the pillar structures 45 and 56 may be made of conductive material, or may be made of nonconductive material.

The present application contains subject matter related to that disclosed in Japanese Priority Patent Application JP 2008-313311 filed in the Japan Patent Office on Dec. 9, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal panel comprising:
   a pair of substrates facing each other with a space in between;
   a liquid crystal layer disposed in the space between the pair of substrates;
   a plurality of pairs of pillar structures, each pair of pillar structures being arranged on opposing faces of the pair of substrates, respectively, to face each other along a normal to the opposing faces;
   a sensor electrode arranged immediately below one of the pair of pillar structures; and
   a facing electrode arranged immediately below the other one of the pair of pillar structures.

2. The liquid crystal panel according to claim 1, wherein the pair of pillar structures face each other with a predetermined gap in between.

3. The liquid crystal panel according to claim 1, wherein the pair of pillar structures face each other, in contact with each other.

4. The liquid crystal panel according to claim 2, wherein a size of the predetermined gap is such that top faces of the pair of pillar structures come directly or indirectly in contact with each other when one or both of the substrates is flexed to a liquid crystal layer side due to external pressure applied thereon.

5. The liquid crystal panel according to claim 1, further comprising a conductive film on a top face of the pillar structures.

6. The liquid crystal panel according to claim 1, wherein the pillar structures are integrally formed with a layer arranged immediately below the pillar structure.

7. The liquid crystal panel according to claim 1, wherein the pillar structures are formed of a material having low wettability with respect to a material used for an alignment film in the liquid crystal panel.

8. The liquid crystal panel according to claim 1, wherein the pair of pillar structures facing each other along the normal to the opposing faces have long-shaped top faces, respectively, longitudinal directions of the long-shaped top faces being different from each other.

9. The liquid crystal panel according to claim 1, wherein top faces of the pillar structures are formed to have a linear shape or a matrix shape.

10. The liquid crystal panel according to claim 1, wherein:
    one or both of the pair of substrates includes a wiring layer, and
    the pillar structures in the substrate with the wiring layer are formed on the wiring layer.

11. The liquid crystal panel according to claim 1, wherein the pillar structures are formed in light shielding regions in the liquid crystal panel.

12. The liquid crystal panel according to claim 1 further comprising alignment films on the opposing faces, respectively, wherein:
    the alignment films are arranged on a region other than the top faces of the pillar structures, or
    a thickness of the alignment film on the top face of the pillar structure is smaller than that of the alignment film arranged on the region other than the top face of the pillar structure.

13. The liquid crystal panel according claim 12, wherein:
    the pair of pillar structures facing each other along the normal to the opposing faces are formed to have height levels different from each other, and
    in the pair of pillar structures, a lower pillar structure has a top face with a smaller area with respect to that of a top face of a higher pillar structure.

14. The liquid crystal panel according to claim 12, wherein:
    the pair of pillar structures facing each other along the normal to the opposing faces are formed to have height levels different from each other, each of the pair of pillar structures having a long-shaped top face different from a perfect circle, and
    in the pair of pillar structures, a lower pillar structure has a top face with a narrower width with respect to that of a top face of a higher pillar structure, the width being defined as a smaller dimension of the long-shaped top face.

15. The liquid crystal panel according to claim 1, further comprising a spacer which defines a distance between the pair of substrates, the spacer separately disposed from the pillar structures.

16. The liquid crystal panel according to claim 15, wherein the spacer is configured of a pair of second pillar structures arranged on the opposing faces of the pair of substrates, respectively, top faces of the pair of second pillar structures being in contact with each other.

17. The liquid crystal panel according to clam 16, wherein the second pillar structure provided on one of the pair of substrates is formed of a material same as that of the pillar structure on the same substrate of the pair of substrates.

18. A liquid crystal display device comprising a liquid crystal panel and a surface-emitting light source emitting light to the liquid crystal panel, the liquid crystal panel including:
    a pair of substrates facing each other with a space in between;
    a liquid crystal layer disposed in the space between the pair of substrates;
    a plurality of pairs of pillar structures, each pair of pillar structures being arranged on opposing faces of the pair of substrates, respectively, to face each other along a normal to the opposing faces;
    a sensor electrode arranged immediately below one of the pair of pillar structures; and
    a facing electrode arranged immediately below the other one of the pair of pillar structures.

* * * * *